US010070095B2

United States Patent
Watson et al.

(10) Patent No.: US 10,070,095 B2
(45) Date of Patent: *Sep. 4, 2018

(54) SYSTEM AND METHOD FOR AUTOMATICALLY CREATING A MEDIA ARCHIVE FROM CONTENT ON A RECORDING MEDIUM

(71) Applicant: INTEL CORPORATION, Santa Clara, CA (US)

(72) Inventors: David J. Watson, Seattle, WA (US); James Bielman, Seattle, WA (US); Phillip Barrett, Shoreline, WA (US); Nicole A. Hamilton, Redmond, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,962

(22) Filed: Jan. 29, 2016

(65) Prior Publication Data
US 2016/0150178 A1 May 26, 2016

Related U.S. Application Data

(63) Continuation of application No. 14/073,447, filed on Nov. 6, 2013, now Pat. No. 9,282,308, which is a
(Continued)

(51) Int. Cl.
*H04N 9/88* (2006.01)
*G11B 5/58* (2006.01)
(Continued)

(52) U.S. Cl.
CPC .......... *H04N 5/76* (2013.01); *G11B 20/1883* (2013.01); *H04N 5/781* (2013.01); *H04N 5/85* (2013.01);
(Continued)

(58) Field of Classification Search
CPC . G11B 20/00942; G11B 20/025; G11B 20/18; G11B 20/1883; G06F 17/30008; G06F 17/30067
(Continued)

(56) References Cited

U.S. PATENT DOCUMENTS 5,822,142 A 10/1998 Hicken
5,832,088 A 11/1998 Nakajima et al.
(Continued)

FOREIGN PATENT DOCUMENTS

WO 2009154948 A1 12/2009
WO 2009154949 A1 12/2009
WO 2009155205 A1 12/2009

OTHER PUBLICATIONS

U.S. Appl. No. 14/466,829, Notice of Allowance, dated Sep. 8, 2016, 9 pages.
(Continued)

*Primary Examiner* — Thai Tran
*Assistant Examiner* — Syed Hasan
(74) *Attorney, Agent, or Firm* — Stoel Rives LLP

(57) ABSTRACT

A media player may include a media reader to read media content from a recording medium inserted into the media reader. The media player may also include a media analysis component to identify one or more valid portions of the recording medium containing media content and one or more invalid portions of the recording medium without media content. In one embodiment, the media player includes an archival component to store the media content from the one or more valid portions in a storage medium and a playback component to play back the one or more valid portions of the media content from the storage medium concurrently with the identification of the one or more valid
(Continued)

portions by the media analysis component and the storage of the media content by the archival component.

20 Claims, 8 Drawing Sheets

Related U.S. Application Data continuation of application No. 12/332,121, filed on Dec. 10, 2008, now Pat. No. 8,582,954.

(60) Provisional application No. 61/012,500, filed on Dec. 10, 2007, provisional application No. 61/073,794, filed on Jun. 19, 2008.

(51) Int. Cl.

| | | |
|---|---|---|
| *G11B 17/04* | (2006.01) | |
| *H04N 5/76* | (2006.01) | |
| *G11B 20/18* | (2006.01) | |
| *H04N 5/781* | (2006.01) | |
| *H04N 5/85* | (2006.01) | |
| *H04N 5/907* | (2006.01) | |
| *H04N 9/87* | (2006.01) | |
| *H04N 5/94* | (2006.01) | |
| *G06F 17/30* | (2006.01) | |
| *H04N 5/765* | (2006.01) | |
| *H04N 5/775* | (2006.01) | |
| *H04N 9/82* | (2006.01) | |

(52) U.S. Cl.
CPC .............. *H04N 5/907* (2013.01); *H04N 9/87* (2013.01); *G06F 17/30286* (2013.01); *H04N 5/765* (2013.01); *H04N 5/775* (2013.01); *H04N 5/94* (2013.01); *H04N 9/8205* (2013.01)

(58) Field of Classification Search
USPC .......................... 386/270; 369/53.15, 53.17; 707/999.004, 999.2; 720/600
See application file for complete search history.

(56) References Cited

U.S. PATENT DOCUMENTS

| | | | |
|---|---|---|---|
| 6,069,952 A | 5/2000 | Saito et al. | |
| 6,408,406 B1 | 6/2002 | Parris | |
| 6,798,972 B1 | 9/2004 | Ito et al. | |
| 7,027,373 B2* | 4/2006 | Ueda ................ | G11B 20/00086 369/53.15 |
| 7,065,019 B2* | 6/2006 | Park ................... | G11B 20/1883 369/53.15 |
| 7,079,752 B1 | 7/2006 | Leyendecker | |
| 7,353,543 B2 | 4/2008 | Ohmori et al. | |
| 7,356,246 B1 | 4/2008 | Kobb | |
| 7,464,125 B1 | 12/2008 | Orszag et al. | |
| 7,490,265 B2 | 2/2009 | Baskey et al. | |
| 7,555,779 B2 | 6/2009 | Nakano et al. | |
| 7,647,277 B1 | 1/2010 | Blumenfeld et al. | |
| 8,033,909 B2 | 10/2011 | Collar et al. | |
| 8,135,761 B2 | 3/2012 | Watson et al. | |
| 8,165,142 B2 | 4/2012 | Karaoguz et al. | |
| 8,555,087 B2 | 10/2013 | Chasen | |
| 8,582,954 B2 | 11/2013 | Watson | |
| 8,600,950 B2 | 12/2013 | Watson | |
| 8,819,457 B2 | 8/2014 | Chasen et al. | |
| 2002/0051494 A1 | 5/2002 | Yamaguchi et al. | |
| 2002/0145966 A1 | 10/2002 | Hirotsune et al. | |
| 2003/0158861 A1* | 8/2003 | Sawdon ............. | G06F 11/1435 |
| 2003/0163823 A1 | 8/2003 | Logan et al. | |
| 2004/0022521 A1 | 2/2004 | Kishi et al. | |
| 2004/0128497 A1 | 7/2004 | Hoshino | |
| 2004/0210593 A1 | 10/2004 | Hirano et al. | |
| 2005/0050557 A1* | 3/2005 | Gabryjelski ......... | G11B 27/034 720/600 |
| 2005/0152675 A1 | 7/2005 | Hanes | |
| 2005/0169467 A1 | 8/2005 | Risan et al. | |
| 2005/0182328 A1 | 8/2005 | Matsumoto et al. | |
| 2005/0226320 A1 | 10/2005 | Lambert et al. | |
| 2005/0232577 A1 | 10/2005 | Green | |
| 2006/0064716 A1 | 3/2006 | Sull et al. | |
| 2006/0114787 A1 | 6/2006 | Festal et al. | |
| 2006/0195909 A1 | 8/2006 | Boswell et al. | |
| 2007/0053513 A1 | 3/2007 | Hoffberg | |
| 2007/0061364 A1 | 3/2007 | Klein | |
| 2007/0079145 A1 | 4/2007 | Saito | |
| 2007/0182700 A1 | 8/2007 | Baba et al. | |
| 2007/0217769 A1 | 9/2007 | Super et al. | |
| 2007/0239699 A1* | 10/2007 | Murrells ........... | G06F 17/30749 |
| 2007/0257247 A1 | 11/2007 | Ando | |
| 2007/0299873 A1 | 12/2007 | Jones et al. | |
| 2008/0010509 A1 | 1/2008 | Southerland et al. | |
| 2008/0075426 A1 | 3/2008 | Lang et al. | |
| 2008/0095339 A1 | 4/2008 | Elliott | |
| 2008/0141133 A1 | 6/2008 | Yamamoto et al. | |
| 2009/0080870 A1 | 3/2009 | Mudie et al. | |
| 2009/0148125 A1 | 6/2009 | Watson et al. | |
| 2009/0150409 A1 | 6/2009 | Watson et al. | |
| 2009/0202068 A1 | 8/2009 | Oureshi et al. | |
| 2009/0319807 A1 | 12/2009 | Chasen et al. | |
| 2015/0071610 A1 | 3/2015 | Chasen et al. | |

OTHER PUBLICATIONS

U.S. Appl. No. 14/466,829, Non-Final Office Action, dated Apr. 21, 2016, 9 pages.
U.S. Appl. No. 12/332,110, Final Office Action, dated Aug. 17, 2011, 23 pages.
U.S. Appl. No. 12/332,110, Non-Final Office Action, dated Jan. 20, 2011, 22 pages.
U.S. Appl. No. 12/332,110, Notice of Allowance, dated Jan. 27, 2012, 25 pages.
U.S. Appl. No. 12/332,121, Final Office Action, dated Apr. 16, 2012, 23 pages.
U.S. Appl. No. 12/332,121, Notice of Allowance, dated Jul. 22, 2013, 12 pages.
U.S. Appl. No. 12/332,121, Non-Final Office Action, dated Oct. 5, 2011, 20 Pages.
U.S. Appl. No. 12/483,107, Non-Final Office Action, 15 pages, dated Feb. 19, 2013.
U.S. Appl. No. 12/483,107, Final Office Action, dated Aug. 17, 2011 23 pages.
U.S. Appl. No. 12/483,107, Non-Final Office Action, 21 pages, dated Jan. 31, 2012.
U.S. Appl. No. 12/483,107, Non-Final Office Action, dated Feb. 19, 2013, 15 pages.
U.S. Appl. No. 12/483,107, Response to Final Office Action, dated Jan. 24, 2013, 13 pages.
U.S. Appl. No. 12/483,107, Non-Final Office Action, dated Jan. 31, 2012, 40 pages.
U.S. Appl. No. 12/483,107, Notice of Allowance, dated Jun. 3, 2013, 10 pages.
U.S. Appl. No. 12/483,107, Response to Non-Final Office Action, dated May 14, 2013, 15 pages.
U.S. Appl. No. 12/483,107, Response to Non-Final Office Action, dated May 31, 2012, 17 pages.
U.S. Appl. No. 12/483,107, Final Office Action, dated Oct. 25, 2012, 19 pages.
U.S. Appl. No. 13/414,563, Notice of Allowance, dated Sep. 25, 2013, 11 Pages.
U.S. Appl. No. 14/073,447, Final Office Action, dated Aug. 13, 2015, 18 pages.
U.S. Appl. No. 14/073,447, Non-Final Office Action Received, dated Mar. 3, 2015, 42 pages.
U.S. Appl. No. 14/073,447, Notice of Allowance, dated Nov. 4, 2015, 17 pages.

(56) References Cited

OTHER PUBLICATIONS

U.S. Appl. No. 14/466,829, Response to Non-Final Office Action, dated Aug. 13, 2015, 16 pages.
U.S. Appl. No. 14/466,829, Non-Final Office Action, dated May 13, 2015, 32 pages.
U.S. Appl. No. 14/466,829, Final Office Action, dated Nov. 23, 2015, 28 pages.
PCT/US2009/045026, International Search Report and Written Opinion, dated Jul. 14, 2009, 8 pages.
PCT/US2009/045028, International Search Report and Written Opinion, dated Jul. 7, 2009, 8 pages.
PCT/US2009/047089, International Search Report and Written Opinion, dated Dec. 21, 2010, 10 pages.

* cited by examiner

SYSTEM AND METHOD FOR AUTOMATICALLY CREATING A MEDIA ARCHIVE FROM CONTENT ON A RECORDING MEDIUM

CROSS-REFERENCE TO RELATED APPLICATIONS

This application is a continuation of U.S. patent application Ser. No. 14/073,447, filed Nov. 6, 2013, for "System and Method for Automatically Creating a Media Archive from Content on a Recording Medium," which is a continuation of U.S. patent application Ser. No. 12/332,121, filed Dec. 10, 2008, for "System and Method for Automatically Creating a Media Archive from Content on a Recording Medium," which claims the benefit of U.S. Provisional Application No. 61/012,500, filed Dec. 10, 2007, for "Video Player," and of U.S. Provisional Application No. 61/073,794, filed Jun. 19, 2008, for "Video Player," each of the foregoing applications of which is hereby incorporated herein by reference in its entirety.

TECHNICAL FIELD

The present disclosure relates to media playback and recording.

DETAILED DESCRIPTION

Figure 1:
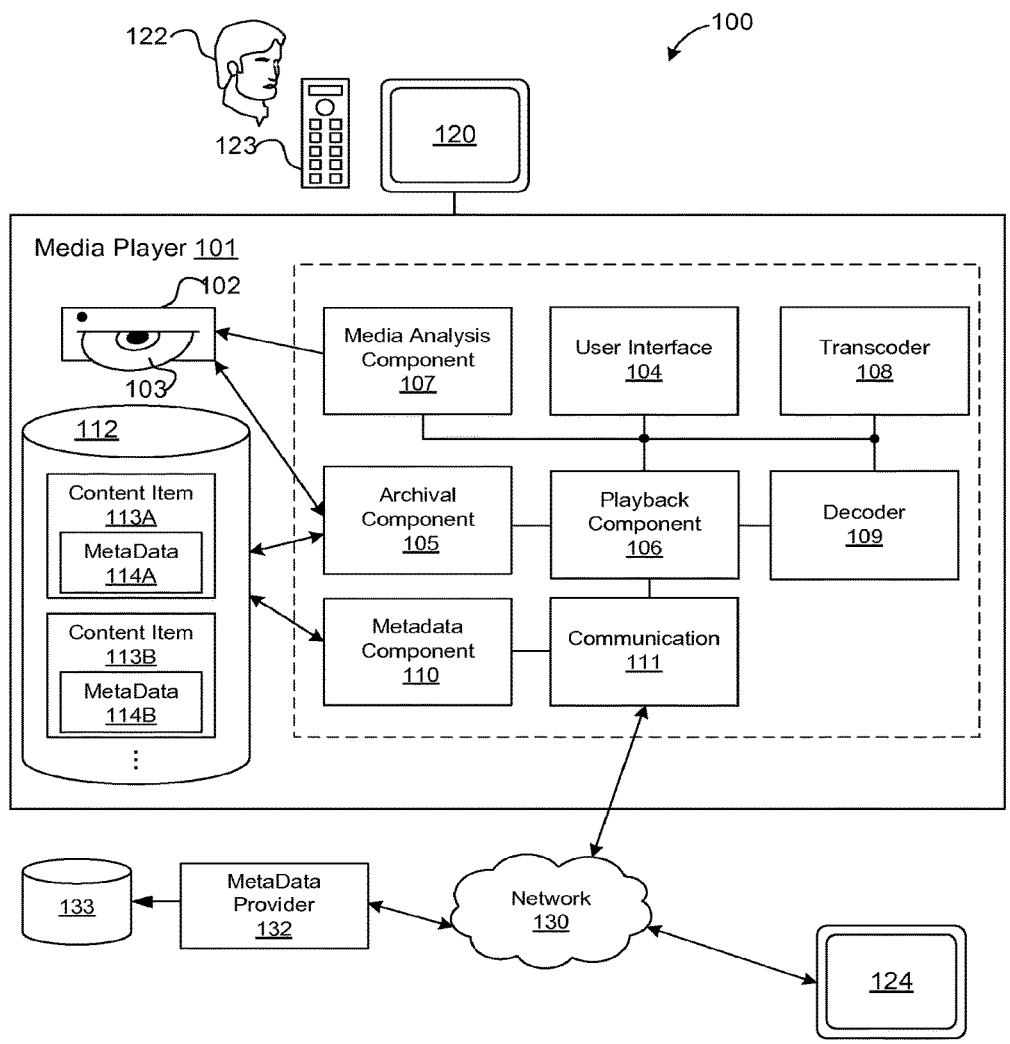
FIG. 1 is a block diagram of a system for automatically creating a media archive from content on recording medium.

FIG. 1 is a block diagram of a system 100 for automatically creating a media archive from content stored on a recording medium 103. In one embodiment, a user is not required to explicitly instruct the system 100 to create the media archive other than to initiate playback of the content (or to simply insert the recording medium). Subsequently, the user may view the media content directly from a media archive without having to use the recording medium.

In one embodiment, the system 100 includes a media player 101. The media player 101 may include a media reader 102 capable of reading media content (e.g., movies, television shows, audio recordings, games, etc.) from a recording medium 103, examples of which may include digital versatile discs (DVDs), Blu-Ray® discs, compact discs (CDs), solid-state memory devices, Flash memory devices, or the like. The media player 101 may also include a user interface component 104, an archival component 105, a media playback component 106, a media analysis component 107, a transcoder 108, a decoder 109, a metadata component 110, and a communication module 111. The media player 101 may further include a computer-readable storage medium 112, which may include one or more archived media content items (e.g., content items 113A and 113B). Each of the components 104-112 is described in greater detail below.

The components 104, 105, 106, 107, 108, 109, and/or 110 may be implemented as computer-readable instructions executable by a general purpose processor, such as a Core™ 2 Duo processor from Intel®, an Athlon™ processor from Advanced Micro Devices (AMD), or the like, and/or a special purpose processor, such as an Application Specific Integrated Circuit (ASIC), a Field Programmable Gate Array (FPGA), or the like. In some embodiments, the components 104, 105, 106, 107, 108, 109, and/or 110 may be implemented using a combination of processors, such as a general purpose and a special purpose processor. Similarly, one or more of the components 104, 105, 106, 107, 108, 109, and/or 110 may include dedicated hardware components. For example, the decoder 109 may include decoder hardware controlled by instructions executing on a general purpose processor.

The media player 101 may be coupled to a display 120, such as a television, computer monitor, a PDA/smart phone display, etc., using one or more standard video connections, e.g., High-Definition Media Interface (HDMI), Radio Frequency (RF) coaxial, composite video, S-video, Digital Visual Interface (DVI), Video Graphics Array (VGA), or the like. The display 120 may present media content to a user 122, who may control the operation of the display 120 and/or media player 101 using a remote control 124. Alternatively, or in addition, the media player 101 may be communicatively coupled to a remote display 124 via a network 130. In such an embodiment, the media player 101 may be configured to stream media content to the remote display 124 over the network 130.

The media player 101 may include one or more inputs (not shown) to allow the user 122 to control the operation of the media player 101. Alternatively, or in addition, the user 122 may control the operation of the media player 101 using a remote control device 123. The user interface component 104 of the media player 101 may present controls, status information, and other interface components on the display 120 and/or the remote display 124. The user 122 may interact with the user interface presented by the user interface component 104 to view the status of the media player 101 and/or control its operation.

As will be described in additional detail below, an archival component 105 of the media player 101 may be configured to archive at least a portion of the media content on the recording medium 130 on the computer-readable storage medium 112. FIG. 1 shows examples of archived content items 113A and 113B.

In one embodiment, the media content on the recording medium 103 may be concurrently archived by the archival component 105 and played back by the playback component 106 e.g., in a single "play and save" operation. As such, the user interface component 104 may provide a "play and save" user interface input element. Selection of the play and save input by a user 122 may cause the archival component 105 to begin archiving and playing the media content on the recording medium 103.

Alternatively, or in addition, the archival may commence as soon as the recording medium 103 is made available to the media player 101. For example, the archival component 105 may begin archiving a recording medium 103 as soon as the medium 103, such as a DVD disc, is inserted into the media reader 102.

As shown in FIG. 1, the storage medium 112 may store one or more archived media content items (e.g., content items 113A-113B). The storage medium 112 may include, but is not limited to one or more hard discs (e.g., discs comprising magnetic storage medium), optical media, volatile memory, non-volatile memory, Flash memory, or the like. In some embodiments, portions of the storage medium 112 may be disposed within the media player 101 and other portions of the storage medium 112 may be disposed externally of the media player 101. The portions of the storage medium 112 disposed outside of the media player 101 may be communicatively coupled to the media player 101 via a Universal Serial Bus (USB) connection, an IEEE 1394 (Firewire®) connection, a network connection, or the like. In some embodiments, the storage medium 112 may include a plurality of storage devices, such as a Redundant Array of Inexpensive Discs (RAID), a storage area network (SAN), a network-attached storage (NAS), a cluster, or other data storage configuration. Similarly, portions of the storage medium 112 may be removable from the media player 101. For example, discs may be swapped into and out of the media player 101, flash or other memory types may be inserted and/or removed from the media player 101, and so on.

After the multimedia content on the recording medium 103 is archived in the storage medium 112 (e.g., content items 113A and 113B), the content may be played by the playback component 106 of the media player 101 without requiring the recording medium 103 to be inserted into the player 101. Similarly, the playback component 106 may play media content from the storage medium 112 as it is archived by the archival component 105 (e.g., concurrently with archiving the media content 103). Collectively, the stored content items 113A and 113B are referred to herein as a content "archive" or "library."

As an example, a user may have a DVD movie collection including dozens or even hundreds of DVDs. As each DVD movie is played in the media player 101, a backup or archive of the movie may be stored on the storage medium 112. Archival may take place upon insertion of the recording medium 103 into the media reader 102 or in response to a single command to play and save the recording medium 103 received via the user interface component 104 (e.g., via a "play and save" user interface element). Once the contents of the DVDs have been added to the media archive, subsequent playback using the playback component 106 may occur without having to handle the recording medium 103. In this way, a media archive may be automatically created as one or more users of the media player 101 play various recording media (e.g., such as the recording medium 103), without requiring the one or more users to perform a dedicated archiving step.

In some embodiments, the media analysis component 107 of the media player 101 may be configured to analyze the recording medium 103 as the recording medium 103 is archived in the storage medium 112. The media analysis component 107 may allow the media player 101 to determine the structure of the media on the recording medium 103. For example, a DVD movie stored on the recording medium 103 (e.g., a DVD movie disc) may include various segments, such as one or more previews, one or more special features, one or more menus, the movie itself (e.g., comprising one or more "chapters"), and so on. The media analysis component 107 may identify each segment on the recording medium 103. The data describing the structure of the recording medium 103 may be stored in the storage medium 113 in association with its respective content item (e.g., content item 113A-113B). The data describing the structure of the content item ("content item structure data") may include a map relating content item features (e.g., preview, menu, and so on) to locations within the archived content item.

Using the content item structure information, the media player 101 may allow the user 122 to skip to any portion or segment of a content item. For example, the user 122 may direct the media player 101 (e.g., via a user interface presented by the user interface component 104) to immediately begin playing a particular chapter of an archived DVD movie, skipping the previews, menu, and the like.

The content item structure data may further include one or more user-defined bookmarks. The user-defined bookmarks may point to arbitrary positions within a content item. For example, the user 122 (through the user interface component 104) may cause the media player 101 to create a bookmark to a particular portion of an archived DVD movie. This may allow the user to return to the bookmark without navigating through the DVD chapter menu or the like. The content item structure information, including any user-defined bookmarks, may be stored as content item metadata (e.g., metadata 114A and 114B) within the storage medium 112.

The media analysis component 107 may also be used to detect and/or avoid media obfuscation schemes. The recording medium 103 may include obfuscated data. Such obfuscation data may include one or more "bad sectors" on the recording medium 103, which may cause a sequential archival of the recording medium 103 to fail. For instance, the obfuscation sectors may be linked together in an infinite loop and/or the sectors may be configured to intentionally cause read failures and/or timeouts. Successive timeouts and/or read failures due to the bad sectors may cause an archiving process to fail and/or take an inordinate amount of time (in the case of an infinite loop, the archival may never complete).

The media analysis component 107 may be used to analyze the recording medium 103 (e.g., "walk" the recording medium 103) to determine the valid portions thereof. The media analysis component 107 may execute virtual machine instructions to allow the media analysis component 107 to emulate the operation of a standard media player (e.g., a normal DVD player). During a walk operation, the media analysis component 107 may access the recording medium 103 from its beginning (e.g., at the "first-play" program chain). The walk may follow the program chain as a standard media player would until a branch or other terminator is reached. In some cases, the media data read from the recording medium during the walk process may be discarded as quickly as possible. This may allow the media analysis component 107 to quickly walk the recording medium 103. Alternatively, the media analysis component 107 may read the media data from the recording medium 103 for archival by the archival component 105.

When the walk process reaches a branching point (e.g., menu), the media analysis component 107 may store a record of both its current state and the state after following each branch (e.g., each menu option). The current state and branch state may be stored in a media walk data structure (e.g., a stack), which may be used to determine which portions of the recording medium 103 have been visited by the walk process. A branch may be implemented as DVD instructions interpretable by the virtual machine emulator of the media analysis component 107. The media analysis component 107 may follow each branch to thereby determine whether the branch represents valid data.

Alternatively, or in addition, before following a branch and/or adding the branch state to a media walk data structure, the media analysis component 107 may determine whether the branch is likely to lead to valid data. For example, if a branch is reachable by an "invalid" menu option, the portion of the recording medium 103 corresponding to the branch (and data on the recording medium 103 associated therewith) may be marked as "bad" and ignored. The media analysis component 107 may detect invalid menu options in a number of different ways. For example, a menu option that falls outside of the viewable area of a display, is "invisible," is very small, is displayed for only a few frames, or the like, the media analysis component 107 may be considered an invalid menu option. However, other invalid menu item detection techniques could be used according to the nature of the obfuscation scheme in use on the recording medium 103.

The current state of the media walker and the state of the walker after following any of the links may be stored in a media walker data structure (e.g., on a stack-type data structure). The media analysis component 107 may walk each branch of the recording medium 103 in the data structure as described above. Subsequent branches may be similarly evaluated and/or followed as described above. Upon reaching the end of a branch segment, the media analysis component may recursively traverse any remaining branches in the media walker data structure. If a branch leads to bad sectors, is circular (links back to an area of the disc already visited by the walk process), is an infinite still frame, is unreachable by other portions of the DVD, or the like, the branch (and portions on the recording medium 103 associated therewith) may be marked as "bad." The branch evaluation and walking process may continue until all valid sectors on the recording medium 103 have been identified (e.g., until all branches on the recording medium 103 have been evaluated and/or walked). The result of the walk operation may be a graph data structure of the recording medium 103 comprising the valid branches and/or sectors thereon.

The walk process of the media analysis component 107 may be performed concurrently with archival and/or playback of the recording medium 103. As such, the media analysis component 107 may communicate with the archival component 105 and/or playback component 106 to synchronize the walk operation such that the portions of the recording medium 103 read by the media analysis component 107 correspond to the portions requested by the archival and/or playback components 107 and 108. Similarly, the operation of the components 104, 107, and 108 may be synchronized to minimize disc seeking. In this way, the media analysis component 107 may analyze the structure of the recording medium 103 without disrupting archival and/or playback of the recording medium 103.

The storage medium 112 may have sufficient storage space to hold a particular amount of media content (e.g., a particular number of DVD movies or the like). For example, the storage medium 112 may have sufficient storage capacity to allow for the storage of twenty (20) to one hundred (100) movies. In some embodiments, however, the storage medium 112 may be expandable with additional internal and/or external storage to allow the media player 101 to hold an arbitrary amount of media content.

In some embodiments, the media storage capacity of the storage medium 112 may be increased by compressing the media content stored thereon. Video and/or audio content items on the recording medium 103 may be encoded in a first encoding format. For example, DVD movies on a DVD disc recording medium 103 may be encoded in the Motion Picture Experts Group 2 (MPEG-2) format. In addition, the DVD movie content may be encrypted (e.g., scrambled) using an encryption scheme, such as Content Scramble System (CSS), Data Encryption Standard (DES), Blowfish, or the like. The encryption may serve a digital rights management (DRM) function to prevent unauthorized replication and/or playback of the content on the recording medium 103.

In one embodiment, the media player 101 is configured to re-encode content read from the recording medium 103 as it is archived on the storage medium 112. For example, content originally encoded in the MPEG-2 format may be transcoded into a second (different) format, such as H.264, VC-1, RealVideo®, or the like. The transcoding may be performed in real-time or at such times as the media player 101 is not performing other tasks. Similarly, the media player 101 may be configured to decrypt (e.g., unscramble) content on the recording medium 103. The decrypted and/or transcoded content may be stored on the storage medium 112 and/or made available for display (e.g., on the display 120 and/or the remote display 124).

As described above, the decryption and/or transcoding operations of the transcoder may be implemented using a general purpose processor, special purpose processor, and/or one or more special purpose hardware components.

The transcoder 108 may be configured to re-encode content items (e.g., content items 112A and/or 112B) according to various different encoding formats. Alternatively, or in addition, the transcoder 108 may be configured to automatically transcode content read from the recording medium 103 as it is read by the media reader 102.

As an example, the storage medium 112 of FIG. 1 includes content items 113A and 113B, each of which may have been encoded using MPEG-2, a relatively inefficient encoding format. In one embodiment, the content items 113A and 113B may be re-encoded using H.264, which produces substantially smaller files while preserving the same quality. As a result, the storage medium 112 may hold additional content items. Similarly, the recording medium 103 may include content encoded in the MPEG-2 format. As the archival component 105 stores the media content in the storage medium 112, the transcoder 108 may automatically transcode the media (e.g., into H.264, or another encoding format).

In addition to improving storage utilization, content may be transcoded from formats for which direct hardware decoding is not readily available. For instance, the decoder 109 of the media player 101 may be configured to decode one or more media encoding formats. As discussed above, the decoder 109 may include computer-readable instructions executable by a general or special purpose processor and/or may comprise one or more hardware components.

However, the recording medium 103 and/or content items stored on the storage medium 112 may be encoded in a format that is not supported by the decoder 109, such as content encoded using Microsoft's Windows Media Video (WMV) encoding format. As such, in order to play back the content, the media player 101 may have to decode the WMV content using a software decoding process (e.g., on a general purpose processor (not shown)), which may be computationally expensive and, in some cases, may produce sub-par results. Accordingly, the transcoder 108 may be configured to transcode the content into a format that is decodable by the decoder 109. This may allow the media player 101 to leverage the software and/or hardware decoding resources available on the media player 101 to provide for efficient, high-performance content playback.

Similarly, in some embodiments, the media player 101 may be configured to transmit media content to a remote display, such as the remote display 124. The remote display 124 may be communicatively coupled to the media player 101 via a network 130. The network 130 may include any communications network known in the art including, but not limited to a Transmission Control/Internet Protocol (TC/IP) network, a wireless network (e.g., IEEE 802.1a-n network, Bluetooth®, or the like), a cellular network (e.g., a 3G network or the like), a Local Area Network (LAN), a Wide Area Network (WAN), the Internet, or the like. The media player 101 may include a communications module 111 which may be configured to communicatively couple the media player 101 to the network 130. Accordingly, the communications module 111 may include one or more communications interfaces, such as an Ethernet® communications interface, a wireless network interface, a Bluetooth® interface, a cellular telephone interface, a Public Switched Telephone Network (PSTN) interface, or the like.

The transmission of content from the media player 101 to the remote display 124 may include streaming the content to the remote display 124 over the network 130. The transcoder 108 may be configured to transcode media content read from the recording medium 103 and/or stored in the storage medium 112 into a format suitable for transmission to and/or display on the remote display 124. For example, video content encoded using MPEG-2 may be transcoded into a RealVideo® stream, which may be efficiently transmitted to the remote display 124 via the network 130. The nature of the transcoding may depend upon the bandwidth available to the media player 101 and the remote display 124 and/or the capabilities of the remote display 124. For instance, the remote display may include one or more decoders capable of decoding media content in a particular encoding format. The media player 101 may be configured to determine which formats are supported and/or preferred by the remote display 124 and to transcode the media content transmitted to the remote display 124 accordingly.

As discussed above, the transcoder 108 may transcode media content as it is read from the recording medium 103 and/or after archiving the media content on the storage medium 112. The transcoder 108 may transcode code media content for various purposes including, but not limited to decrypting (e.g., unscrambling) the media content, compressing the media content (e.g., to increase the virtual storage capacity of the storage medium 112), transcoding the content into a format for which hardware decoding is available (e.g., into a format adapted for the decoder 109), transcoding the media content into a streamable format, transcoding the media content into a format suitable for display on a remote display device, such as the remote display 124, or the like.

As discussed above, the user interface component 104 of the media player 101 may allow the user 122 to control the operation of the media player 101. Control instructions may be received via a remote control device 104 and/or via one or more interfaces on the media player 101 (e.g., controls disposed on the player 101, such as buttons, toggles, and the like) and/or controls presented on the display 120. For instance, the display 120 may be a touch screen display. The media player 101 may cause one or more control interfaces to be presented on the display 120 to allow the user 122 to control the operation of the media player 101.

The user interface component 104 may provide a "play and save" input. Selection of the "play and save" input may cause the media player 101 to archive the media content on the recording medium 103 while playing back the media content on the display 120 and/or remote display 124. As such, the recording medium 103 may be concurrently archived and played by invoking a single command. Alternatively, or in addition, the media player 101 may be configured to begin archiving the recording medium 103 upon detecting insertion of the recording medium 103 into the media reader 102.

As discussed above, the media player 101 may be configured to display media content stored on the recording medium 103 while concurrently storing the media content in the storage medium 112. In this way, an archive or library of stored content items (e.g., content items 113A-113B) may be created while the user 122 views the content. Accordingly, the user 122 need not archive the media content in a separate step (e.g., the user 122 need not separately archive and view the content items 113A-113B since the content items 113A-113B are stored as the user views the respective content items). Similarly, a user 122 may archive the media content on a recording medium 103, while playing back archived media content (e.g., content items 113A or 113B). The media reader 102 may be capable of reading the recording medium 103 faster than the normal playback speed. For instance, the recording medium reader 102 may be capable of reading data from the recording medium 103 at 4X to 16X, i.e., four (4) or sixteen (16) times playback speed. Accordingly, the media player 101 may be capable of archiving the media content on the recording medium 103 before the user 122 is finished viewing the content item. In such an embodiment, the playback component 107 may be configured to play media content read from the storage medium 112 rather than from the recording medium 103 directly.

The user interface component 104 of the media player 101 may include controls to allow the user 122 to control the playback of the media content. For example, as the media player 101 concurrently plays back and archives media content on a recording medium 103, the user 122 may instruct the player 101 to navigate to a different location within the content (e.g., fast forward within the content, jump a particular chapter or section, or the like).

These instructions may be received before all of the media content has been archived on the storage medium 122. When the media player 101 receives such a navigation instruction, the player 101 may determine whether the requested content has been stored on the storage medium 122. If the media content is not yet available on the storage medium 122, the archival component 105 may "skip" to the requested location and to continue archiving the media. This may allow the playback component 106 to play the media at the requested location (e.g., by reading the requested location within the media content from the storage medium 112). If the requested media content has already been archived, the playback component 106 may obtain the requested content from the storage medium 112 and display the content for the user 122.

To track which portions of the media content on the recording medium 103 have been archived (e.g., stored on the storage medium 112), the archival component 105 may maintain a data allocation map (DAM) associated with the media content on the recording medium 103. In some embodiments, the DAM may include a table-like data structure comprising a list of sectors on the recording medium (or other delimiters, such as cells, nodes, or the like) with respective, corresponding indications a status of the portion of the recording medium. The status may indicate whether the portion of the recording medium 103 has not yet been accessed; whether the portion of the recording medium 103 has been archived (e.g., stored in the storage medium 112); whether a read error and/or timeout was encountered when the portion of the recording medium 103 was accessed (e.g., the portion of the recording medium 103 may be damaged); whether the portion of the recording medium 103 contains invalid data; and the like. As various sectors of the media content are accessed and stored in the storage medium 112, the archival component 105 may update the DAM to indicate that the sectors have been archived and are available for playback from storage medium 112.

Using the DAM, the playback component 106 may determine whether a particular portion (e.g., sector) of the media content of the recording medium 103 is available on the storage medium 112. Similarly, the DAM may be used by the archival component 105 to "fill in" any missing (e.g., un-archived) sectors of the media content item on the storage medium 112. For example, a user may insert a DVD recording medium 103 into the media player 101 and immediately navigate to an ending portion of the media content (e.g., a last chapter of the DVD movie). Similarly, a user may insert a DVD, play a portion of the DVD, and then eject it before the archival component 105 finishes archiving the media content thereon. As described above, during navigation and/or reinsertion of the recording medium 103, the media player 101 may access the DAM associated with the recording medium 103 to determine whether the requested portion has been archived. If not, the media player 101 may direct the archival component 105 to navigate to the requested portion of the recording medium 103, and the content may be archived and made available for playback as described above. The archival of the requested portion of the content may allow the playback component 106 to play the media content from the storage medium 112. After the media player 101 has archived the requested portion of the recording medium (e.g., the "end" of the media content), the archival component 105 may be configured to go back and archive any skipped portions of the content. The skipped (un-archived) portions of the content item may be identified using the DAM. Similarly, if the DAM indicates that read errors were encountered during archival, the archival component 105 may attempt to re-archive those portions of the recording medium 103.

The metadata component 110 of the media player 101 may be configured to receive and associate one or more pieces of data (e.g., metadata) with content items stored in the storage medium 112. The metadata may include descriptive information associated with a respective content item (e.g., metadata 114A may describe the content item 113A, and the metadata 1146 may describe the content item 113B). The metadata may include one or more metadata items relating to a content item (e.g., DVD movie, audio track, or the like) and may include, but are not limited to, a title of a content item, a table of contents, a rating, a credits listing, a plot synopsis, one or more graphical assets (e.g., an image of a DVD movie cover, image(s) associated with a scene (which may comprise a reference to such image(s) within the content item), or similar), one or more tags, one or more content item categories, a content item genre, and so on.

The metadata component 110 may receive metadata associated with a content item (e.g., metadata 113A an 1136) from the user 122 via the user interface component 104 (e.g., the user 122 may manually input metadata describing the content). Alternatively, or in addition, the media player 101 may be configured to obtain metadata relating to a content item from a metadata provider 132 accessible via the network 130. The metadata component 110 may be communicatively coupled to the metadata provider 132 via the network 130. In some embodiments, the metadata provider 132 may include and/or be communicatively coupled to a metadata data store 133. The metadata data store 133 may include metadata relating to a plurality of different content items (e.g., DVD movies or the like). Alternatively, or in addition, the media player 101 may include a local metadata data store (not shown) similar to the data store 133, which may include metadata relating to various content item (e.g., DVD movies, music albums, or the like). The local metadata store may be pre-loaded with metadata relating to various content items (e.g., metadata of hundreds or thousands of DVDs, CD, and so on). The local metadata data store may be periodically updated via the network 130, updated via the media reader 122 (e.g., a recording medium 103 may include additional metadata), updated by a removable storage medium, or the like.

To receive metadata information relating to a content item from the metadata provider, the metadata component 101 may generate and transmit metadata query to the metadata provider 132. The query may identify the content item for which metadata is requested. The content item identifier may include, but is not limited to a title of the content, a table of contents, a DVD media identifier, a value derived from one or more identifiers (e.g., a hash value or the like), a combination of identifiers, or other identifying information. The content item identifier may be transmitted to the metadata provider 132 (e.g., in a query for metadata), and may be used by the metadata provider 132 to look up metadata related to the content item in the metadata data store 133. Upon accessing the metadata information, the metadata provider 132 may transmit the information to the metadata component 110 via the network 130.

The metadata component 110 may be configured to store the metadata received from the metadata provider 132 in the storage medium 112. The metadata may be associated with (e.g., linked to) a respective content item in the storage medium 112 (e.g., the metadata 114A may be associated with content item 113A, and metadata 114B may be associated with content item 113B). The association may be made by a database association (e.g., as a table within a database, as a key value, or the like), a data structure association (e.g., within an XML or other structured data format), or the like.

The user interface component 104 may display metadata associated with one or more a content items. For example, the user interface component 104 may display content items 113A-113B stored on the storage medium 112 in a list or other selection interface. Each content item in the list may be displayed in conjunction with one or more pieces of metadata. For example, a DVD movie content item 113A may be displayed using metadata content, such as a graphic of the DVD movie cover, the DVD movie title, a scene from the DVD movie, a DVD movie rating, a plot synopsis, a genre, one or more tags, or the like.

The user interface component 104 may include various different content item display interfaces. For example, the user interface component 104 may include display interfaces that include only content items of a particular genre (e.g., action), a particular rating, or the like. The metadata of the content items 112A-112B stored may be used to determine whether a particular content item should be included in the list.

The metadata 114A and 1146 associated with the content items 113A and 1136 may allow for sorting and/or searching thereof. For example, a user may search the content items 113A-113B for a particular actor name (e.g., "De Niro"). Responsive to the search, the user interface component 104 may cause a listing of content items having the term "De Niro" in the list of actors to be presented on the display 120. Any search term pertaining to any metadata category and/or type could be used under the teachings of this disclosure.

Figure 2A:
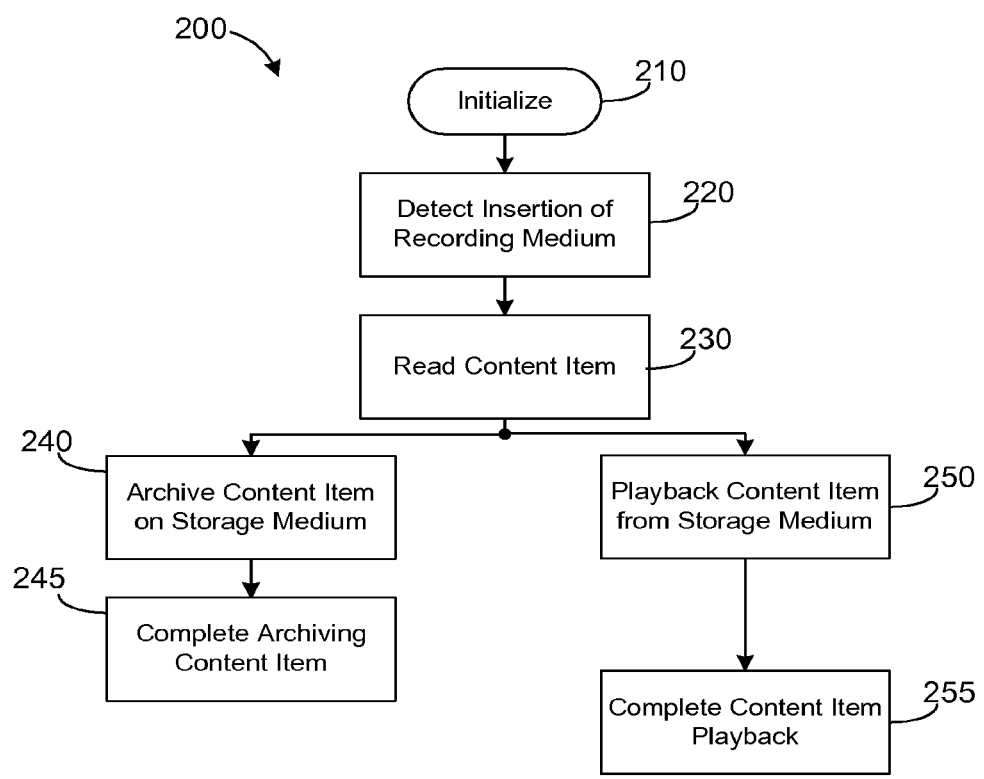
FIG. 2A is a flow chart of a process for archiving and playing media content from a recording medium.

FIG. 2A is a flow chart of one embodiment of a process 200 for concurrently archiving and playing a content item. At step 210, the process 200 may be initialized by allocating and/or initializing required resources, such as memory, storage locations, network connections, device (e.g., a media reader device), and the like.

At step 220, a recording medium may be inserted in a media reader. For instance, the recording medium may include a DVD movie, and the media reader may be a DVD media reader.

At step 230, the process 200 may instruct the reader to begin reading the content from the DVD media at a media read rate. As discussed above, many media readers are capable of reading data at a higher rate than playback speed (e.g., 16X playback speed).

At step 240, media content read from the media reader may be archived in a storage medium.

At step 250, and concurrently with step 240, the media content archived in the storage medium may be accessed and presented on a display. Since, as discussed above, the media reader may be capable of reading data from the media at or above playback speed, the playback of step 250 may occur concurrently with the archiving of step 240.

At step 245, the storage of the content item in a storage medium may complete, and, at step 255, the playback of the content item may complete. As discussed above, since the media reader may be capable of reading media at or above playback speed, the storage of the content item at step 245 may complete before the playback of the content item at step 255.

As discussed above, after archiving the content item on the storage medium, the content item may be made available for subsequent playback. The content item may be played back directly from the archived content in the storage medium and, as such, may not require the recording medium (e.g., DVD disc) to be present in the media reader for playback.

Figure 2B:
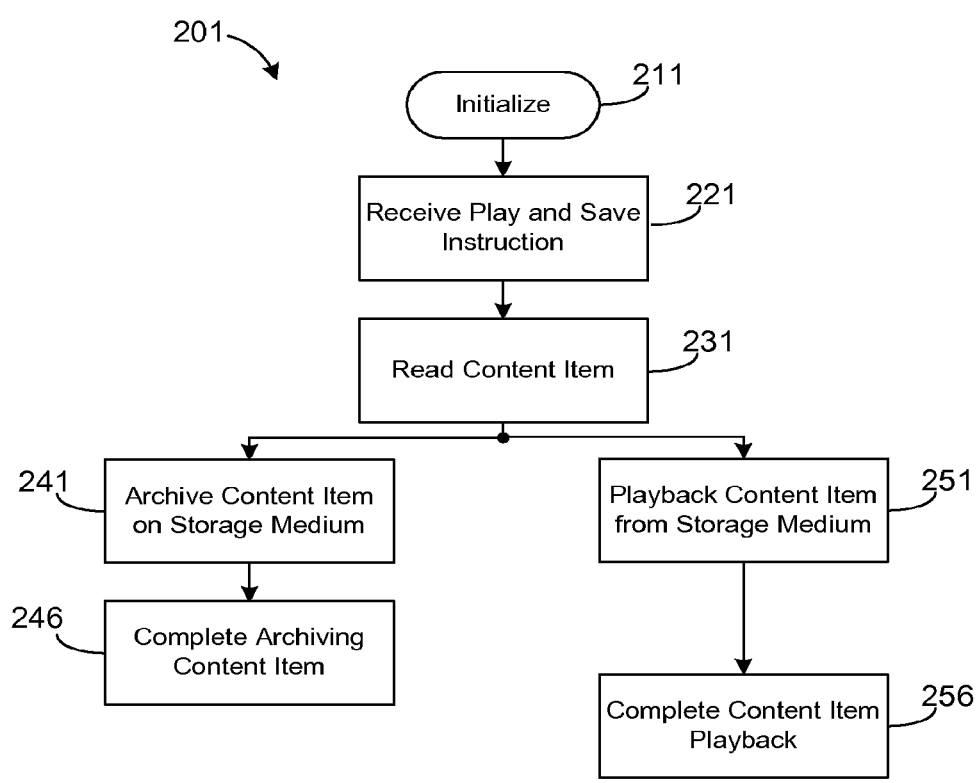
FIG. 2B is a flow chart of another process for archiving and playing media content from a recording medium.

FIG. 2B is a flow chart of another embodiment of a process 201 for concurrently archiving and playing a content item. At step 211, the process 200 may be initialized as described above in conjunction with step 210 of FIG. 2A. At step 221, an instruction to "play and save" a content item stored on a recording medium may be received. The instruction may be received by means of a remote control device, one or more inputs disposed on a surface of a media player, or the like. The play and save instruction may, in a single step, cause the process 201 to concurrently archive and playback a content item stored on a recording medium. The concurrent archival and playback of steps 231-256 may be performed as described above in conjunction with steps 230-255 of FIG. 2A.

Figure 3A:
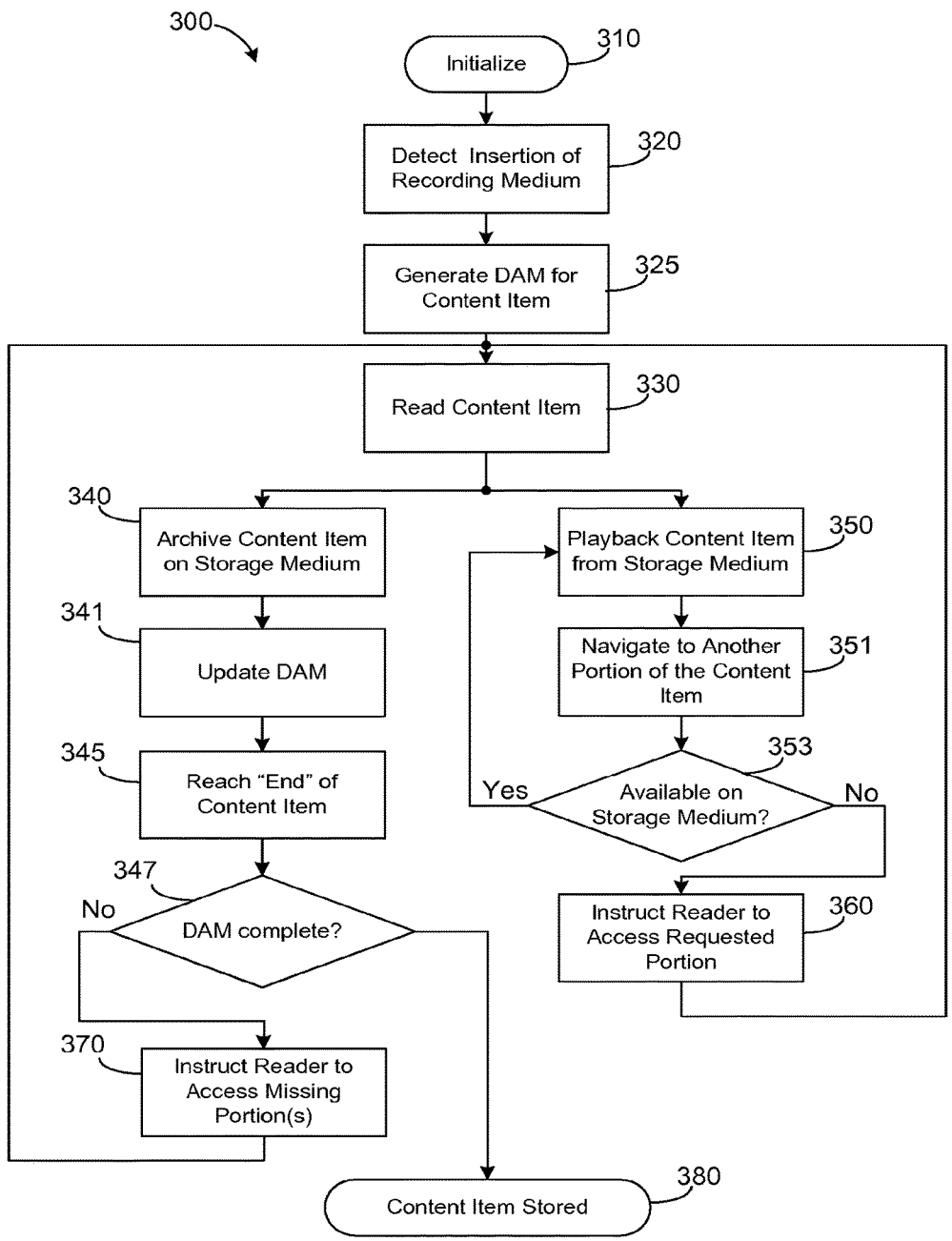
FIG. 3A is a flow chart of a process for tracking the archiving and playback of media content from a recording medium using a data allocation map.

FIG. 3A is a flow chart of one embodiment of a process 300 for concurrently storing and playing back a content item. At steps 310 and 320, the process 300 may be initialized, and a recording medium may be inserted into a media reader as described above.

At step 325, a data allocation map (DAM) may be generated for the content on the recording medium. As described above, the DAM may include a map of the portions of data available on the media (e.g., arranged into sectors, chapters, nodes, or the delimiter types). Each of the portions on the media may be associated with an indicator showing the status of the respective portion. The DAM may support various different indicators including, but not limited an indicator that the portion has been archived (e.g., is stored on a storage medium); an indicator that the portion has been accessed for archiving (e.g., no attempt has yet been made to archive the portion of the recording medium); an indicator the last attempt to access the portion resulted in a read error or timeout; an indicator that the portion of the recording medium comprises invalid data (e.g., as indicated by a media analysis component, such as the component 107 of FIG. 1); and so on. For example, the indicator of a particular portion may be a Boolean and/or bitwise indicator (e.g., bitmask) to reflect one or more of the states discussed above (e.g., a bitwise one (1) may indicate that the portion has been archived, a bitwise zero (0) may indicate that the portion has not been accessed, a two (2) may indicate an error was encountered, and so on).

At steps 330, 340, and 350, the process 300 may direct the media reader to begin reading media content from the media, to archive the media content in a storage medium, and to playback the stored media content as described above.

The archiving of step 340 may take place over time. For example, the media reader may sequentially read portions of the content item from the recording medium. As each portion (e.g., sector, segment, or other delimiter) of the content item on the recording medium is read, it is archived at step 340. If a portion of the recording medium is successfully archived, the DAM may be updated accordingly. If a reading error and/or timeout is encountered, the process 300 may re-try reading the portion a threshold number of times. The read attempt threshold may be adaptable according to the progress of the playback portion of the process 300 (e.g., at steps 350-353 below). For example, if the playback process is occurring in the logical vicinity of the portion, the number of read attempts may be reduced to prevent the attempts from interfering with the playback. Alternatively, if the playback process is not playing back media content in the logical vicinity of the portion, the number of read attempts may be increased since the read attempts are unlikely to interfere with playback.

The archiving of step 340 may be performed in conjunction with a media analysis component, such as the media analysis component 107 of FIG. 1. As discussed above, the media analysis component may walk the recording medium to determine which portions of the recording medium contain valid media data, and which do not. This information may be stored in a graph, a list, or other data structure describing the structure of the recording medium. As such, at step 340, the process 300 may use the information gathered by the media analysis component to avoid portions of the recording medium that have been marked as containing "invalid data" (e.g., may consult the graph, list, or other data structure before identifying the valid and invalid portions of the recording medium before attempting to archive a portion of the recording medium). Similarly, in other embodiments, at 340 the process 300 may restrict the archiving to only the portions of the recording medium identified by the media analysis component as containing valid media content.

At step 341, the DAM may be updated to reflect the status of the portion of the recording medium. For example, if the portion of the recording medium was successfully archived, the corresponding entry in the DAM may be updated to indicate that the portion is available on the storage medium. If a read error and/or time out was encountered, the DAM may be updated to indicate the error. In some embodiments, the error indicator may indicate the number of attempts made to read the content. Similarly, the DAM may be updated to indicate that a media analysis component determined that the portion contains invalid data.

At step 351, the process 300 may receive an instruction to navigate to another portion of the content item on the recording medium. For example, the process 300 may receive an instruction to navigate to a particular chapter within a DVD movie. The navigation instruction of step 351 may be received from a user of the process 300 via a user interface (e.g., user interface 112 of FIG. 1).

At step 353, the process 300 may determine whether the portion of the media content item requested at step 351 has been archived and is available for playback from the storage medium. The determining of step 353 may include accessing the DAM associated with the content item. If the DAM indicates that the portion could not be archived due to a read error and/or timeout, the portion may be skipped by the playback, and a "next" navigation may be directed to the next "good" portion of the recording medium. The "next" portion may be the following segment of the recording medium and/or a portion linked to the segment in the recording medium. This skipping may cause the playback to jump around the damaged portion of the recording medium. If the requested portion (or next good portion) of the recording medium is available, the flow may continue at step 350 where the process 300 may play the requested portion of the content item from the storage medium. If the requested portion is not available, the flow may continue at step 360.

At step 360, the process 300 may instruct the media reader to access the requested portion of the content item. This may cause the media reader to "skip" to another portion of the recording medium. After navigating to the requested portion of the recording medium, the process 300 may read the content item from the requested position at step 330. The requested portion will be archived at step 340, and the DAM will be updated at step 341. As such, the requested portion of the content item may be played back from the storage medium at step 350 as described above.

At step 345, the media reader may reach an "end" of the content item. At step 347, the DAM may be evaluated to determine whether all of the content item has been archived on the storage medium. As described above, the content item may not be stored sequentially due to user navigation within the content item. As such, the DAM may have one or more gaps. At step 347, the DAM may be accessed to determine whether any portion of the content item has not been archived (e.g., whether any of the entries in the DAM are "FALSE" or zero (0)). If no such portions remain, the content item has been completely archived, and the flow may terminate at step 380.

At step 370, if portions remain to be archived, the process 300 may instruct the media reader to access the un-archived portions of the content item on the recording medium. The missing portions of the recording medium may then be archived in the storage medium at steps 340 and 341, as described above. Since the process 300 plays back the content item from the storage medium, the navigation and archival of steps 370, 340, and 341 may be performed concurrently with playback of the content item without interfering with the playback of the content item.

Figure 3B:
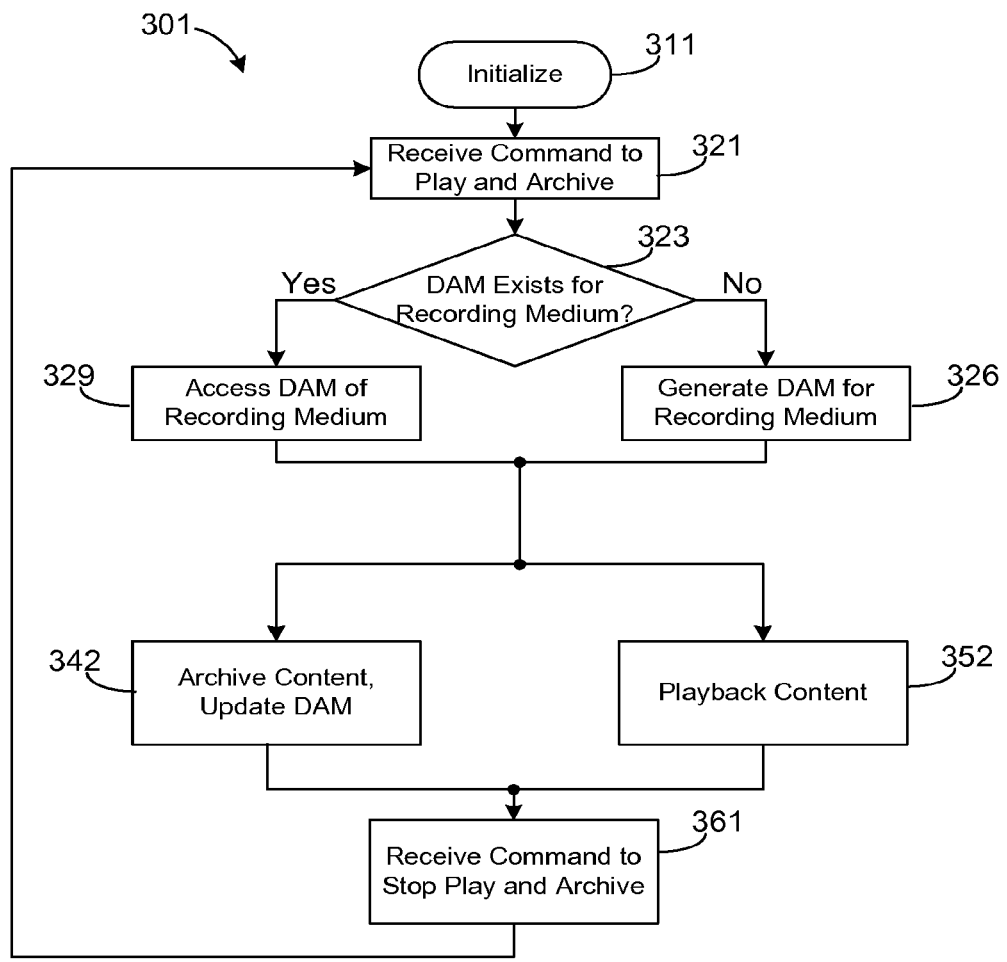
FIG. 3B is a flow chart of a process for tracking the archiving and playback of media content from a recording medium using an allocation map.

FIG. 3B is a flow chart of another embodiment of a process 310 for archiving and playing back media content from a recording medium. At step 311, the process 301 may be initialized as described above.

At step 321, a command to play and archive media content on a recording medium may be received. The command of step 321 may be received via a user interface component (e.g., via a user interface input produced by the user interface component 104 of FIG. 1). Alternatively, or in addition, the command of step 321 may be produced responsive to detecting insertion of a recording medium into a media reader (e.g., detecting the insertion of a DVD disc into a DVD reader of a media player).

At step 323, the process 301 may determine whether a DAM exists for the recording medium in the media reader. In some embodiments, this may comprise generating a recording medium identifier or media content identifier. Examples of various recording medium and/or media content identifiers are provided below in conjunction with FIG. 4. Upon generating the identifier, the process 301 may determine whether a DAM has been associated with the identifier, by querying a storage medium for the DAM using the identifier (e.g., the storage medium 112 of FIG. 1). For example, the storage medium may include a relational database or other data relational system (e.g., search functionality provided by the storage medium). DAM data structured stored on the storage medium may be associated with the identifier (e.g., as a "key" of a database table of the DAM or the like). If a DAM for the recording medium exists, the flow may continue at step 329; otherwise, the flow may continue at step 326.

At step 326, a new DAM may be generated for the recording medium as described above. The DAM may be keyed to a recording medium identifier and stored in a storage medium for subsequent access by the process 301.

At step 329, the existing DAM for the recording medium may be accessed. The existing DAM may indicate that portions of the recording medium have already been archived in the storage medium. As such, the process 301 may not need to re-archive the entire recording medium, rather only those portions of the recording medium which, as indicated by the DAM, have not yet been archived. Similarly, playback of the archived portions of the recording medium may be possible without re-archiving. In addition, the existing DAM may include media analysis information (e.g., a graph or other structure generated by the media analysis component 107 of FIG. 1). The media analysis information may indicate which portions of the recording medium are valid, which contain errors (e.g., scratches), and so on.

At step 342, the process 301 may read content from the recording medium, archive the content in a storage medium, and update the DAM as described above. Also as described above, at step 352, media content may be played back from the storage medium. Although not depicted in FIG. 3B, the reading and archiving of step 342 may navigate to different portions of the recording medium responsive to the playback. For example, a user may request playback of a portion of the recording medium that has not yet been archived. Responsive to such a command, the recording medium may be read and archived at step 342 at the requested location as described above.

At step 361, a command to stop the play and archive process may be received. The command of step 361 may be received via a user interface input. Alternatively, or in addition, the command may be produced responsive to the recording medium being ejected from the media reader.

The command of step 361 may be received before the recording medium has been fully archived (e.g., before all of the media content on the recording medium has been stored on the storage medium). However, the partial archive (and DAM associated therewith) may be maintained on the storage medium. Upon subsequent insertion of the recording medium (or command to play and/or archive the recording medium), the process 301 may pick up where it left off. In some embodiments, the partial archive may be maintained on the storage medium indefinitely. Alternatively, the partial archive may be maintained for a threshold period of time or may be maintained as long as there is sufficient storage space within the storage medium (e.g., after a threshold period of time and/or upon detecting that the storage medium is running low on storage space, the partial archive may be removed). Similarly, a user interface option may allow a user to decide whether and/or how long the partial archive should be maintained. If sufficient media content has been stored, playback of the partially archived media content may be provided as described above.

After receiving the command of step 361, the process 301 may return to step 321 where a command to archive the recording medium may be received. As discussed above, the command of step 321 may be received responsive to detecting insertion (or re-insertion) of the recording medium into the media reader). Similarly, the command of 321 may be received via a user interface component. As shown in FIG. 3B, after receiving the command of step 321, the process 301 may continue the archival of the recording medium where the process 301 left off; the DAM may be detected and accessed at steps 323 and 329. Using the DAM, the process 301 may determine which of the recording medium remain to the archived. In this way, the process 301 may not have to re-archive portions of the recording medium that have already been stored, attempt to archive portions of the recording medium that contain invalid data (e.g., as indicated by a graph or other structured generated by a media analysis component), and so on.

As discussed above, in some embodiments, the DAM indicator of a particular portion of the recording medium may include a plurality of indictors including, but not limited to an "archived" indicator to indicate that the portion has been stored on the storage medium; an un-archived indicator to indicate that the portion has not yet been stored on the storage medium; an indicator that the portion of the storage medium contains invalid data; and/or an "error" indicator to indicate that a read error was encountered during archiving.

In some embodiments, at step 342, the process 301 may ignore portions of the recording having an "error" indicator in the DAM. This may speed up the archiving by preventing attempts at archiving portions of the recording medium thought to be damaged. Alternatively, the process 301 may attempt to archive portions of the recording medium marked with an "error" indicator. This may give the process 301 another attempt at archiving the portion. For example, after stopping the playback and archival process 301 at step 361 (e.g., by ejecting the recording medium and/or receiving a command via a user interface), a user may have attempted to repair the recording medium and/or may have procured a different copy of the recording medium. As such, the portion of the recording medium that caused an error during a previous read attempt may be successfully read in a subsequent attempt.

In an alternative embodiment, the media player 101 may access a pre-existing DAM, provided by a metadata provider 132 or other party who may aggregate DAM information, and may use the pre-existing DAM to speed up archival of the recording medium 103 and/or to compare the data on the recording medium 103 to that in the pre-existing DAM. In an alternative embodiment, the media player 101 may transmit the locally generated DAM to a metadata provider 132 or other party who may aggregate DAM information.

Figure 4:
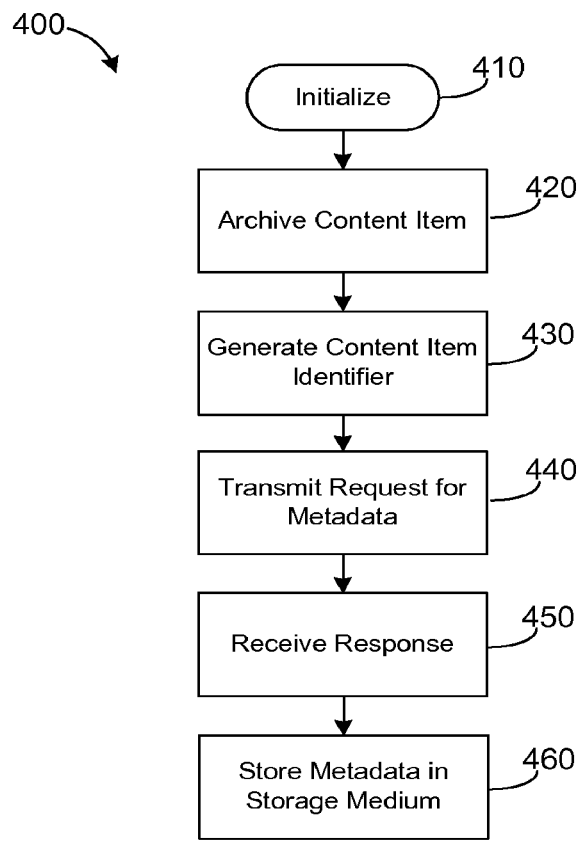
FIG. 4 is a flow chart of a process for acquiring metadata related to media content.

FIG. 4 is a flow chart of one embodiment of a process 400 for acquiring metadata relating to a content item. At step 410, the process 400 may be initialized as described above.

At step 420, a content item may be archived. The archiving of step 420 may be performed using, for instance, the system 100 of FIG. 1 and/or using a process or processes, such as the processes 200, 201, and/or 300 described above.

At step 430, a content item identifier may be generated. The content item identifier may be a title of the content item, a recording medium identifier, a table of contents of the content item, a partial or complete DAM, a hash value comprising a combination of identifiers, or the like. The identifier may be generated before completion of the archival of the content item. For example, the content item identifier may be generated (and the metadata may be retrieved) upon detecting insertion of the recording medium.

At step 440, a request for metadata may be generated and submitted to a metadata provider. The request submitted at step 440 may include the content item identifier generated at step 430. Submitting the request may comprise transmitting the request to a metadata provider over a network. As described above, a metadata provider may receive the request, and, using the content item identifier generated at step 430, may access (e.g., look up) metadata related to the content item in a content item database or other data store.

The metadata provider may transmit a response to the request of step 430. The response may include metadata relating to the content item. The response may be received at step 450. At step 460, the metadata may be stored in a storage medium (e.g., in the storage medium 112 of FIG. 1). The metadata may be associated with the content item in the storage medium (e.g., via a database association, a structural association, or the like).

The metadata associated with the content item may be used to categorize the content item according to a content item genre, rating, or the like. Similarly, the metadata may be searchable. This may allow a user to perform detailed searches for particular types of content items. For example, a user may search for all content items in the "action" genre, having a "PG-13" rating or lower, and so on. Similarly, the metadata may be used in content item listings or other display interfaces. For example, a set (e.g., list) of content items may be presented by displaying metadata associated with each content item in the set. For instance, a set of DVD movie content items may be presented by displaying graphical metadata (e.g., DVD movie cover) and title metadata of the respective content items.

Figure 5:
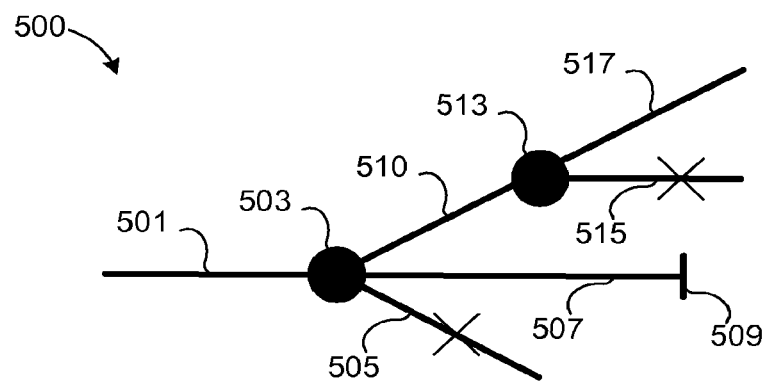
FIG. 5 depicts a media content graph comprising a plurality of media content segments interconnected by a plurality of branches.

FIG. 5 depicts a media content graph comprising a plurality of media content segments interconnected by a plurality of branches. The graph 500 may correspond to media content stored on a recording medium, such as the recording medium 103 of FIG. 1. The graph may include one or more media data segments (e.g., 501, 505, 507, 510, 515, and 517) interconnected by one or more branches (e.g., 503 and 513). Each of the segments 501, 505, 507, 510, 515, and/or 517 may correspond to a linked series of data on a recording medium, such as a series of linked cells on a DVD disc. The graph 500 may be used to indicate which portions of a recording medium are valid (e.g., the unmarked segments 501, 507, 510, and 517) and which are invalid (e.g., which portions of the recording medium contain intentionally invalid data, such as segments 505 and 515). The graph 500 may be used by various components of a media player (e.g., the archival component 105 and/or playback component 106 of FIG. 1) to determine which portions of a recording medium should be archived and/or played back.

The segment 501 may represent a first segment of the media content on a recording medium (e.g., the "first-play" program chain of a DVD recording medium). A media analysis component may access the first segment 501 and walk the segment (e.g., sequentially access linked data segments) until a terminal point 503 is reached. "Walking" the recording medium may include traversing linked sectors and/or cells within a particular segment of the recording medium (e.g., segment 501) as quickly as possible. In some embodiments, during walking, any media content read from the recording medium may be discarded (e.g., video data read from a DVD disc may be ignored) to allow the walk operation to complete as quickly as possible. Alternatively, the media content may be made available to an archival component.

In the FIG. 5 example, the media analysis component may walk the first segment 501 to a branch 503. The branch 503 may include a plurality of outbound links (e.g., links to other data segments on the recording medium). The branch 503 includes outbound links 505, 507, and 510. As discussed above, a media analysis component may determine whether one or more of the branches is valid by examining a menu item associated with the branch (e.g., by examining the menu item which would cause a standard DVD player to follow the respective branches). If a menu item associated with a branch is determined to be a "dummy" menu item, the walker process may mark the branch as "bad," and the content on the recording medium associated with the branch may be ignored. A menu item may be identified as "bad," if it would not be visible on a display, if it would be displayed for a very short period, and so on. The media analysis component may use various mechanisms for determining whether a menu item is not selectable (e.g., invalid). The particular set of mechanisms used to detect invalid menu items may depend upon the nature of the obfuscation scheme in use on the recording medium and may change over time (e.g., as the scheme changes). Examples include, but are not limited to determining that the menu item would be displayed outside of the visible area of the display, would be displayed as an "invisible" element on the display, would have a size below a threshold, is not selectable, is displayed for less than a threshold number of frames, and the like.

In the FIG. 5 example, the menu item associated with the segment 505 is determined to be an invalid menu item and, as such, a portion of the recording medium associated therewith is marked as invalid. This portion of the recording medium may be ignored by the walker process and/or by an archival or playback component. The segments 507 and 510 may be considered valid segments (e.g., the menu item associated with the segments 507 and 510 may be considered to be valid menu items). As such, the portions of the recording medium corresponding to the segments 507 and 510 may be marked as "valid," added to a list of valid portions of the recording medium, added to a graph of valid content on the recording medium, or the like. The media analysis component may walk each of the valid segments 507 and 510 in turn.

In some embodiments, the media analysis component may maintain a state of the graph 500 by storing a current state of the recording medium walker (e.g., a segment address of the branch 503 on the recording medium) and the segment address of each of the valid outbound links. In the FIG. 5 example, the media analysis component may store its current state (e.g., the address of the branch point 503) and the state after following each of the valid menu items (e.g., the address of the segments 507 and 510) in a data structure ("media walk data structure"). The media walk data structure may be a list and/or a stack-type data structure. The media analysis component may continue walking the recording medium by recursively popping and walking recording medium states from the media walk data structure.

In walking the segment 507, the media analysis component may reach a non-branching terminal point 509 (e.g., an end of the segment 507). Upon reaching the terminal point 509, the media analysis component may remove (e.g., pop) the state corresponding to the segment 507 from the media walk data structure, return to the state recorded at the branch 503, and continue walking the recording medium at the next state in the media walk data structure. If the data encountered within the segment 507 is considered to be valid (e.g., does not contain excessive errors, loops, or the like), the segment 507 may be marked as "valid" and/or included in a list of valid portions of the recording medium, in a graph of the valid portions of the recording medium, or the like.

The next state in the media walk data structure may be the segment 510. The media analysis component may walk the segment 510 until the branch 513 is reached. The branch terminal point 513 may include links to two (2) outbound segments on the recording medium, 515 and 517. The menu items of each of the outbound segments 515 and 517 may appear to be valid. As such, the media analysis component may include the states of the segments 515 and 517 in the media walk data structure.

The media analysis component may determine that the segment 515 includes invalid data (e.g., intentionally bad data). However, the bad data of segment 515 may be linked to a menu item identified as a "valid." As discussed above, an obfuscation scheme may use various mechanisms for placing invalid menu items on the recording medium. The mechanisms used by the scheme may change over time. As such, the media analysis component may fail to identify certain invalid menu items, such as the menu item associated with the data segment 515.

The media analysis component may detect intentionally invalid data on the recording medium in various different ways which may include, but are not limited to detecting cyclic data in the segment 515 (e.g., encountering the same data segment (cell) more than once), detecting an infinite still frame in the segment 515, detecting more than a threshold number of read errors in a portion (e.g., cell) of the segment 515, and the like. If invalid data is detected, the portion of the recording medium corresponding to the segment 515 may be marked as "invalid," and the media analysis component may remove the segment 515 from the media walk data structure. The media analysis component may then continue walking the recording medium at the next state in the media walk data structure (e.g., segment 517 of the recording medium). The media analysis component may periodically update its rules for performing the media walk operation using a push or pull from an update server (not shown), from data stored on a recording medium (e.g., the recording medium 103 of FIG. 1), from a removable storage medium, or another source.

The result of the media walk operation described above, may be a graph of the recording medium. The graph may include valid portions of the recording medium. For example, the graph may include a set of segments of the recording medium (e.g., 501, 507, 510, and so on) interconnected by one or more branches on the recording medium (e.g., 503, 513). The graph may include indications of which portions of the recording medium contain valid data (e.g., valid media content) and which do not. Alternatively, the data structure may only contain portions of the recording medium considered to be "valid." As such, in some embodiments, the "bad" portions of the recording medium may be removed from the data structure. Similarly, in some embodiments, the portions of the recording medium identified as "valid" (e.g., containing valid media content) may be placed in a list (e.g., valid data list). Like the graph, the list of valid portions of the recording medium may be used by an archival and/or playback component to quickly identify which portions of a recording medium should be archived and/or played back.

A playback and/or archival component may use the graph 500 (or other data structure) to avoid intentionally invalid data by avoiding segments on the recording medium marked as "bad" and/or restricting archival and/or playback of the portions of the recording medium which have been confirmed as comprising valid media content. Alternatively, the playback and/or archival component may read a recording medium according to a graph or other data structure that includes only valid portions of the recording medium to thereby avoid any invalid portions of the recording medium.

Figure 6:
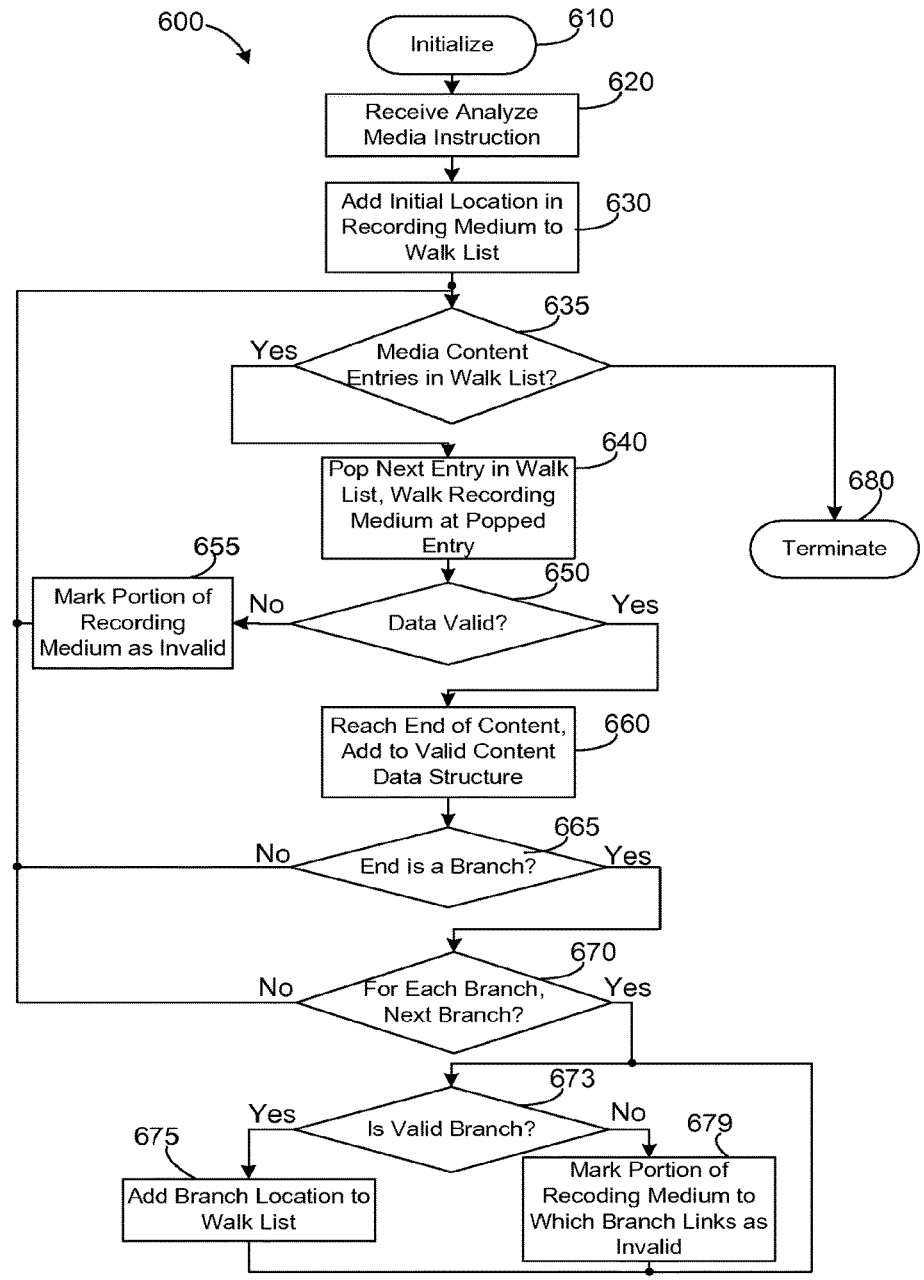
FIG. 6 is a flow chart of a process for determining the structure of media content on a recording medium.

FIG. 6 is a flow chart of a process 600 for determining the structure of media content stored on a recording medium. At step 610, the process 600 may be initialized as described above in conjunction with FIGS. 2-4.

At step 620, a media analysis instruction may be received. In some embodiments, the instruction of step 620 may be generated upon detection of the insertion of a recording medium into a media reader and/or a user selection of a "play and save" user interface input. In other embodiments, the instruction may be produced responsive to a read and/or archiving error detected by an archival component and/or playback component of a media player.

At step 630, an initial location within the recording medium may be added to a media walk data structure. The media walk data structure may include a set of locations (e.g., addresses) within the recording medium believed to comprise valid media content (e.g., a set of states within the recording medium). In some embodiments, the media walk data structure may be a stack-like data structure and, at step 630, the initial location within the recording medium may be pushed thereon.

The initial location may be a starting location within the recording medium (e.g., a "first-play" program chain of a DVD, a beginning portion of an audio CD, or the like). Alternatively, the initial position may be a last known good playback and/or archival position on the recording medium. This may allow the process 600 to generate a partial analysis of the recording medium, which may complete more quickly than a full analysis of the recording medium.

At step 635, the process 600 may determine whether the media walk data structure contains any additional media walk states. Of course, on the first iteration of the step 635 (e.g., after adding the initial location to the walk list), the walk list will include at least one state. If a state exists in the media walk data structure, the flow may continue at step 640; otherwise, the flow may terminate at step 680.

At step 640, the next position within the recording medium may be accessed (e.g., popped from the media walk data structure stack) and the process 600 may "walk" the media data at the popped location. As discussed above, "walking" a recording medium may include reading linked data segments (e.g., cells) from the recording medium as if the process 600 were a standard media player (e.g., a standard DVD player). Accordingly, at step 640, the process 600 may sequentially read linked data segments from the recording medium and/or execute virtual machine instructions as if the process were a standard media player. For example, if the recording medium were a DVD, the process 600 may comprise a DVD virtual machine emulator to emulate the operation of a standard DVD player (e.g., read data from the DVD and/or execute instructions read from the DVD as would a standard DVD player).

In some embodiments, media data (e.g., video data) read during the walking of step 640 may be discarded to speed up the analysis of the recording medium. In this way, the process 600 may progress through the recording medium as quickly as possible. Alternatively, the walking may be performed in conjunction with archival of the recording medium and, as such, media data read during the walking of step 640 may be stored in a storage medium and/or made available to an archival component, such as the archival component 105 of FIG. 1.

At step 650, the process 600 may determine whether the media content walked at step 640 is valid. As discussed above, in some cases, intentionally bad data may be placed on a recording medium to prevent straight-through archival of the recording medium. Some of this bad data may be avoided by analyzing links to various segments on the recording medium (e.g., various mechanisms for avoiding links to intentionally bad data are described below in conjunction with step 673). However, in some cases, not all of the bad data may be avoided in this way. For example, an obfuscation scheme may develop new ways of placing invalid menu items on a recording medium that are more difficult to detect.

At step 650, the process 600 may detect invalid data on the recording medium. The detecting of step 650 may be done using various different detection mechanisms, which may include, but are not limited to detecting cyclic and/or looped data (e.g., encountering the same data (cell) more than once), detecting an infinite and/or excessively long still frame in the data, detecting more than a threshold number of read errors in a portion of the data (e.g., in a particular cell), and so on. If the data is valid, the flow may continue to step 660; otherwise, the flow may continue to step 655.

At step 655, the location (e.g., segment on the recording medium) of the invalid data may be so marked and/or removed from the media walk data structure. Similarly, if the process 600 is maintaining a graph or list structure comprising the valid portions of the recording medium, the segment may be removed therefrom. This may prevent an archival and/or playback component from attempting to access the invalid portion of the recording medium.

At step 660, the walk of step 640 may reach a terminal point. If the terminal point is a branch, the flow may continue at step 670; otherwise, the flow may continue at step 635 where the next state in the media walk data structure may be walked.

At step 670, each possible branch may be evaluated to determine whether the branch links to valid data on the recording medium (e.g., whether the branch is an "actual" branch or a "dummy branch" included as part of an obfuscation scheme). If one or more branches remain to be evaluated the flow may continue at step 673; otherwise, the flow may continue at step 635 where a next state in the media walk data structure may be walked.

At step 673, the process 600 may determine whether a branch links to valid data. As discussed above, the process 600 may use various mechanisms to make this determination including, but not limited to determining whether a menu item associated with the branch would be visible on a display, comparing the size of the menu item to a size threshold, determining whether the menu item is invisible on the display (e.g., comparing the color of the menu item to a back ground color), comparing the number of frames the menu item is to be displayed to a threshold, determining whether the option is selectable, and so on. If, at step 673, the menu item of the branch indicates that branch is valid (e.g., the menu item appears to be a valid, selectable menu item), the flow may continue at step 675; otherwise, the flow may continue at step 679.

At step 675, the branch may be added to the media walk data structure (e.g., pushed onto the media walk stack), and the flow may continue at step 670 where the next branch may be evaluated.

At step 679, the branch may be removed from media walk data structure (or simply not added thereto). In addition, in some embodiments, the branch may be marked as a "bad branch" and/or the portion of the recording medium corresponding to the branch may be marked as "invalid," so that subsequent accesses to the branch and/or data segment by the process 600, an archival component, and/or playback component may be avoided. Similarly, if the process 600 is maintaining a graph or other data structure comprising valid portions of the recording medium, the portion of the recording medium corresponding to the invalid branch may be removed therefrom. The flow may continue at step 670 where the next branch may be evaluated.

By emulating the operation of a standard media player, the process 600 may traverse all of the valid portions of a recording medium. The indicators of which portions of the recording medium contain valid media data (e.g., which branches and corresponding data segments are valid) may be stored in a graph data structure (e.g., as shown in FIG. 5), a list of valid portions of the recording medium, or other structure (e.g., a stack, vector, or the like). The graph or other data structure may be used by other components of a media player to avoid invalid data intentionally placed on the recording medium and/or to distinguish between read errors and/or read timeouts due to recording medium damage and those caused by intentionally placed bad data.

The above description provides numerous specific details for a thorough understanding of the embodiments described herein. However, those of skill in the art will recognize that one or more of the specific details may be omitted, or other processes, components, or materials may be used. In some cases, operations are not shown or described in detail.

Furthermore, the described features, operations, or characteristics may be combined in any suitable manner in one or more embodiments. It will also be readily understood that the order of the steps or actions of the processes described in connection with the embodiments disclosed may be changed. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product, including a computer-readable medium having stored instructions thereon that may be used to program a computer (or other electronic device) to perform processes described herein. The computer-readable medium may include, but is not limited to hard drives, floppy diskettes, optical discs, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implements particular abstract data types.

In certain embodiments, a particular software module may include disparate instructions stored in different locations of a memory device, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of this disclosure.

What is claimed is:

1. A media player comprising:
   a media reader to read media content from a recording medium inserted into the media reader;
   a media analysis component to identify portions of the recording medium as being valid or invalid, wherein the media analysis component identifies the portions of the recording medium as being valid or invalid by executing virtual machine instructions to emulate a media player;
   an archival component to store, in a storage medium, media content read from the recording medium by the media reader, the archival component further to generate a data allocation map including a list of portions of the recording medium with respective corresponding status indicators to indicate a status of each portion and to update the data allocation map as portions of the recording medium are accessed, the status indicators including an archived status indicator and an un-archived status indicator; and
   a playback component to play back the media content of the recording medium from the storage medium concurrently with the archival component storing the media content,
   wherein the archival component is further configured to, after the play back by the playback component from the storage medium of the media content of the recording medium, archive media content of any un-archived portions of the recording medium, based on determining from an un-archived status indicator in the data allocation map that a corresponding portion of the recording medium is an un-archived portion.

2. The media player of claim 1,
   wherein the archival component stores in the storage medium media content read from valid portions of the recording medium and updates the data allocation map with a valid status indicator corresponding to the valid portions or an invalid status indicator for invalid portions.

3. The media player of claim 2, wherein the playback component is configured to play back the media content of the valid portions of the recording medium from the storage medium concurrently with the media analysis component identifying the portions of the recording medium and the archival component storing the media content.

4. The media player of claim 2, wherein the media analysis component evaluates a branch linking to a portion of the recording medium to determine whether the branch is invalid, and wherein the portion of the recording medium to which the branch is linked is not identified as a valid portion of the recording medium if the branch is determined to be invalid.

5. The media player of claim 1, wherein the recording medium is a DVD disc, and wherein the media analysis component emulates a media player by reading data from the DVD disc and executing DVD virtual machine instructions as a DVD player.

6. The media player of claim 1, wherein if a read error is encountered by the media reader, the archival component is configured to update the data allocation map to indicate the read error with an error status indicator.

7. The media player of claim 1, wherein if a timeout is encountered by the media reader, the archival component is configured to update the data allocation map to indicate the timeout with an error status indicator.

8. The media player of claim 1, wherein the archival component is further configured to, upon the media reader reaching an end of the media content on the recording medium, archive media content of any un-archived portions of the recording medium, based on determining from an un-archived status indicator in the data allocation map that a corresponding portion of the recording medium is an un-archived portion.

9. A method of creating a media archive, comprising:
reading media content from a recording medium inserted into a media reader;
identifying portions of the recording medium as being valid or invalid by executing virtual machine instructions to emulate a media player;
generating a data allocation map including a list of portions of the recording medium with respective corresponding status indicators to indicate a status of each portion of the recording medium
storing media content of the recording medium in a storage medium;
updating the data allocation map as portions of the recording medium are accessed, the status indicators including an archived status indicator for portions of the recording medium for which media content is stored in the storage medium and an un-archived status indicator for portions of the recording medium for which media content has not been stored in the storage medium;
playing back the media content of the recording medium from the storage medium concurrently with the storing the media content; and
upon the media reader reaching an end of the media content on the recording medium:
identifying one or more un-archived portions of the recording medium based on one or more corresponding un-archived status indicator in the data allocation map;
reading media content from the one or more un-archived portions of the recording medium; and
storing in the storage medium the media content of the one or more un-archived portions of the recording medium.

10. The method of claim 9, further comprising:
wherein the storing the media content of the recording medium in a storage medium comprises storing the valid portions of the recording medium.

11. The method of claim 10, wherein the playing back the media content of the recording medium from the storage medium comprises playing back the valid portions of the recording medium from the storage medium concurrently with the identifying the portions of the recording medium and the storing the media content.

12. The method of claim 10, wherein identifying the one or more portions of the recording medium as being valid or invalid comprises evaluating a branch linking to a portion of the recording medium to determine whether the branch is invalid, and wherein, if the branch is determined to be invalid, the portion of the recording medium to which the branch is linked is not identified as a valid portion of the recording medium.

13. The method of claim 10, wherein the recording medium is a DVD disc, and wherein emulating a media player comprises reading data from the DVD disc and executing DVD virtual machine instructions as a DVD player.

14. The method of claim 9, wherein if a read error is encountered during the reading the media content, then updating the data allocation map includes indicating the read error with an error status indicator.

15. The method of claim 9, wherein if a timeout is encountered during the reading the media content, then updating the data allocation map includes indicating the timeout with an error status indicator.

16. A non-transitory computer-readable storage medium comprising instructions, that when executed by a media player, cause the media player to:
read media content from a recording medium inserted into a media reader of the media player;
identify portions of a recording medium as being valid or invalid by executing virtual machine instructions to emulate a media player,
generate a data allocation map including a list of portions of the recording medium with respective corresponding status indicators to indicate a status of each portion of the recording medium
store media content of the recording medium in a storage medium;
update the data allocation map as portions of the recording medium are accessed, the status indicators including an archived status indicator for portions of the recording medium for which media content is stored in the storage medium and an un-archived status indicator for portions of the recording medium for which media content has not been stored in the storage medium;
play back the media content of the recording medium from the storage medium concurrently with the storing the media content;
detect reading the media content reaching an end of the media content on the recording medium; and
upon a detection of the reading the media content reaching the end:

identify one or more un-archived portions of the recording medium based on one or more corresponding un-archived status indicator in the data allocation map;

read media content from the one or more un-archived portions of the recording medium; and store in the storage medium the media content of the one or more un-archived portions of the recording medium.

17. The non-transitory computer-readable storage medium of claim 16, wherein to store the media content of the recording medium in the storage medium comprises storing the valid portions of the recording medium.

18. The non-transitory computer-readable storage medium of claim 17, wherein the instructions to cause the media player to play back the media content of the recording medium from the storage medium comprise instructions to cause the media player to play back the valid portions of the recording medium from the storage medium concurrently with identifying the portions of the recording medium and the storing the media content.

19. The non-transitory computer-readable storage medium of claim 17, wherein the instructions that cause the media player to identify the one or more portions of the recording medium as being valid or invalid comprise instructions to evaluate a branch linking to a portion of the recording medium to determine whether the branch is invalid, wherein, if the branch is determined to be invalid, the portion of the recording medium to which the branch is linked is not identified as a valid portion of the recording medium.

20. The non-transitory computer-readable storage medium of claim 16, wherein if a read error is encountered during the reading the media content, then updating the data allocation map includes indicating the read error with an error status indicator.

* * * * *